Feb. 17, 1970  C. W. KRUCKEBERG  3,495,538
AUTOMOTIVE ELECTRIC FUEL PUMP
Filed May 29, 1968  3 Sheets-Sheet 1

INVENTOR
CHRISTIAN W. KRUCKEBERG
BY
Trask, Jenkins & Hawley
ATTORNEYS

Feb. 17, 1970  C. W. KRUCKEBERG  3,495,538
AUTOMOTIVE ELECTRIC FUEL PUMP
Filed May 29, 1968  3 Sheets-Sheet 2

INVENTOR
CHRISTIAN W. KRUCKEBERG
BY
Trask, Jenkins & Hanley
ATTORNEYS

INVENTOR
CHRISTIAN W. KRUCKEBERG
BY
Trask, Jenkins & Hanley
ATTORNEYS

United States Patent Office 3,495,538
Patented Feb. 17, 1970

3,495,538
AUTOMOTIVE ELECTRIC FUEL PUMP
Christian W. Kruckeberg, Fort Wayne, Ind., assignor to Tokheim Corporation, Fort Wayne, Ind., a corporation of Indiana
Filed May 29, 1968, Ser. No. 732,927
Int. Cl. F04c 15/00, 15/04; F16c 1/24
U.S. Cl. 103—118                                     21 Claims

ABSTRACT OF THE DISCLOSURE

An automotive electrical fuel pump for in-line or in-tank mounting. A cast housing forms a two-gear pump chamber and an axially-adjoining motor chamber, which are separated by a loose end plate. A shaded-pole stator assembly rests on a seat formed by shoulders inwardly off-set from the motor-chamber sidewalls, is located by posts on such shoulders, and is held down by an end bell having opposing pads and posts which is pressed down by a spring washer between the bell and a cover. A main shaft, rotating in bearings in the bottom wall of the pump chamber and in the end bell, carries the motor rotor and aligns and drives one pump gear, the other gear being an idler on a stub shaft. Downward thrust of the shaft is taken by the pump end plate, which is held in place by such thrust and by discharge pressure in the motor chamber through which the pump discharges. The end bell forms a receptacle and mounting and heat sink for components of the transistorized electrical circuit for the DC powered shaded-pole motor.

BACKGROUND OF THE INVENTION

This invention relates to an electric fuel pump for automotive use.

Conventional engine-driven fuel pumps commonly used on automobiles have a number of disadvantages. For example, they tend to become vapor locked under hot conditions which occur in the engine compartment where they must be mounted. They inherently require a pump displacement chamber of considerable size from which fuel is vaporized through the carburetor or its vents during the high temperature "hot soak" period which occurs when an engine is stopped and its cooling system inactivated, and such fuel loss to the air causes air pollution and interferes with subsequent starting of the engine.

Electric fuel pumps can be mounted in more favorable positions to avoid these disadvantages. While a number of such pumps have been proposed, none has been successful so far as I am aware in meeting the high reliability and low cost requirements of general passenger car application. It is the purpose of this present invention to provide a motor-pump unit which will have adequate capacity and reliability to meet the exacting demands of general automotive use, which will be of inexpensive construction, and which will supply adequate quantities of fuel at pressures within a desirable limited range.

The structure herein disclosed is especially adapted for use with the electrical circuit of the aforesaid copending application of Paul T. Kachuk, which embodies electrical features which inherently limit the output pressure of the fuel. However, the structure may also be with other electrical circuits and may be provided with a by-pass valve or other hydraulic means to obtain corresponding pressure limitation and control.

By way of example, the specifications for an automotive 12-volt electrical fuel pump require the pump to deliver 35 gallons of gasoline per hour at from 4–5 p.s.i. pressure and to develop not more than 7.5 p.s.i. pressure at any flow rate, when the power source is at 13.5 volts, and under these conditions to draw not more than about 3 amps of current; to deliver at least 30 gallons per hour with the power source at 11 volts; to be capable of running at 8 volts; and to be capable of starting and running at —40° F. The low-cost motor-pump unit of this invention substantially meets these relatively severe requirements.

SUMMARY OF THE INVENTION

In accordance with the present invention, the pump is desirably a freely rotatable pump such as a gear pump. Such pumps are both simple and inexpensive, they provide immediate delivery when started and an immediate pressure drop when stopped, they can be operated effectively over a range of low speeds and with low power, and hence they give long life and permit use of a low cost motor. When such a pump is used with an electrical motor circuit of the type disclosed in the aforesaid copending application, the motor may be a shaded-pole motor having a stator formed of a flat stack of magnetically-permeable sheet metal stampings riveted or otherwise secured together in a conventional manner.

The pump-motor assembly comprises a body housing which forms a motor chamber with a pump cavity in its bottom wall, on a common axis. The pump cavity receives a pair of gears to form a gear pump and is closed and separated from the motor chamber by an end plate having an opening for the main shaft and having a pump outlet opening through which the pump discharges to the motor chamber. The body housing is provided with laterally-spaced shoulders forming a seat for the magnetic field assembly of the motor, and such shoulders carry locating posts which engage in cooperating holes in the stator assembly. The opposite face of the stator assembly is engaged by pads and posts of an end bell which supports an upper bearing for the main shaft and which provides a mounting and heat sink for electrical components of the transistorized motor circuit which is preferably used to drive the shaded-pole motor from a DC supply source. This end bell is held in place by a cover, and the stack of motor parts between the seat and cover desirably includes stressed resilient means, such as a spring washer engaged between the end bell and the cover. Such spring compensates for assembly tolerances and firmly holds the parts in operating relation. The body housing and cover provide an inlet to the pump chamber and an outlet from the motor chamber, each including a flame screen. Electrical connections are desirably made by grounding the body housing and providing a supply terminal through an insulating plug in a wall of the assembly.

The body housing cover desirably forms a mounting for the unit, and such mounting may be either an "in-line" or "in-tank" mounting.

Further and other features of the invention will be apparent from the following description and from the illustrative disclosure of the accompanying drawings. In such drawings.

Figure 1:
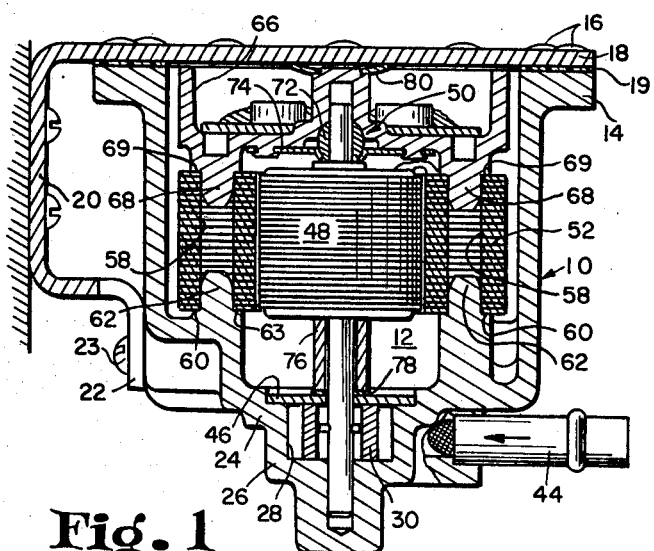
FIG. 1 is a section on the center line of the main shaft of a motor pump unit embodying the invention.
Figure 2:
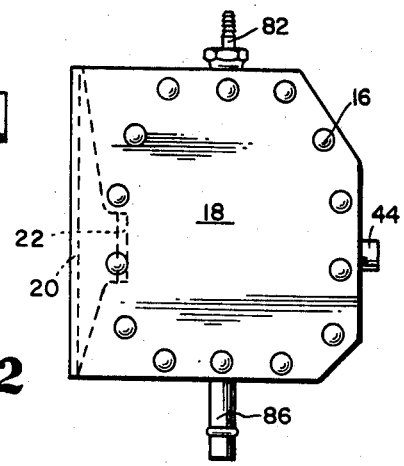
FIG. 2 is a top plan view of the unit shown in FIG. 1.

The motor-pump unit shown in FIGS. 1–6 comprises a body housing 10 having side and bottom walls defining a motor chamber 12 and provided at its upper edge with a peripheral rim 14 which carries a series of rivet studs 16. These are received through holes in a mounting and cover plate 18 and a gasket 19, and are riveted over to attach the body housing to the plate. The cover plate 18 is joined to a mounting wall 20, the lower end of which carries an inwardly off-set tongue 22 held against the side of the body housing 10 by a screw 23.

The bottom wall 24 of the body housing 10 carries a downward projection 26 which defines an 8-shaped cavity forming a pump chamber 28 which receives two pump gears 30 and 32. The gear 32 is an idler and is rotatable on a stub shaft 34 pressed or otherwise fixed in the bottom wall of the body housing. The gear 30 is driven, and on its axis the bottom of the body housing 10 is drilled to form a bearing 36 (or to receive an inserted bearing) for the lower end of the main shaft 40. The gear 30 is carried by such shaft 40 and has diametrically opposite keyways 38 engaged by a cross pin 42 in the shaft 40. The downward projection 26 of the body housing 10 has a lateral opening in which is pressed a nipple 44 providing an inlet to the pump formed by the gears 30 and 32.

The top of the pump chamber is closed by an end plate 46 received on a peripheral shoulder on the body housing. Such plate has an opening for the main shaft 40 and a second opening 47 in position to form a discharge passage from the pump chamber 28 to the motor chamber 12.

The motor comprises a rotor 48 mounted on the main shaft 40 which is rotatably supported at its lower end by the bearing 36 and at its upper end by an end-bell bearing 50. The stator 52 of the motor comprises a stack of flat laminations of magnetically permeable sheet metal, of conventional configuration for a shaded-pole motor and secured together by rivets 53. Such stator assembly has a winding leg 54 which carries a bobbin 56 on which the motor windings are wound. The stator 52 is provided with two mounting holes 58 coplanar with the shaft axis and offset to the sides of that axis, as shown in FIG. 1. Each side wall of the body housing 10, over the areas opposite the pole-forming leg of the stator, is offset inward as shown in FIG. 1, and at such offsets the body housing forms two opposite lands 60 which together form a mounting seat for the stator. Each such land 60 carries an upstanding post 62 having an annular mounting shoulder 63 at its base. Each land also forms a second mounting face or pad 64 offset from the post 62 and coplanar with the shoulder 63. The posts 62 enter the holes 58 in the stator 52 to locate the stator on the seat in proper alignment for driving of the rotor 48.

An end bell 66 overlies the upper face of the stator 52 and has a pair of downward extending posts 68 with shoulders 69 at their bases, and pair of pads 70 offset from such posts 68. The posts 68 enter the upper ends of the holes 58 of the stator 52 and the pads 70 engage the upper face of the stator 52 at points opposite to the pads 64 of the body housing seat.

The upper bearing 50 for the main shaft 40 comprises a bearing sleeve 72 mounted in a spherical seat formed in the end bell 66 and retained by a spring clip 74. The bearing sleeve 72 may be of any suitable material, such as carbon, adapted to operate as a bearing when immersed in liquid fuel. Such bearing sleeve 72 serves primarily as a radial bearing, but has a flat bottom surface which lies closely opposite a thrust face at the upper end of the rotor 48, to act as a thrust bearing opposing upward movement of the shaft 40 and rotor 48. Below the rotor 48, the shaft 40 carries a spacer 76 which engages against a pair of thrust bearing shims 78 supported by the upper face of the pump chamber end plate 46.

The end bell 66 is pressed downward by a spring washer 80 which rests on a shouldered boss coaxial with the main shaft 40 and bears upward against the lower face of the cover plate 18. Such spring washer 80 presses the end bell 66 firmly downward against the top face of the stator 52 and presses such stator 52 firmly downward against the seat 60 formed in the body housing 10, and hence firmly positions the stator in place in the body housing 10, while allowing for considerable assembly tolerance, and especially for variation in the thickness of the stack of laminations forming the stator 52.

The motor winding on the bobbin 56 is energized through a terminal 82 mounted in a molded insulating plug 84 threaded into an opening in one end of the body housing 10. The terminal 82 has an inner projecting end which is connected to one lead for the winding. The circuit is completed by connecting the other lead to the body housing and grounding such body housing.

The pump inlet is provided by the inlet nipple 44 leading to the inlet side of the pump chamber 28. The pump discharges through the opening in the end plate 46 to the motor chamber 12, and such chamber is normally filled with liquid gasoline. From this chamber, the fuel is delivered through an outlet nipple 86 pressed into an opening at the top of the body housing 10. A conical flame screen 88 is fixed in the housing at the inner end of each pressed-in nipple 44 and 88.

Figure 3:
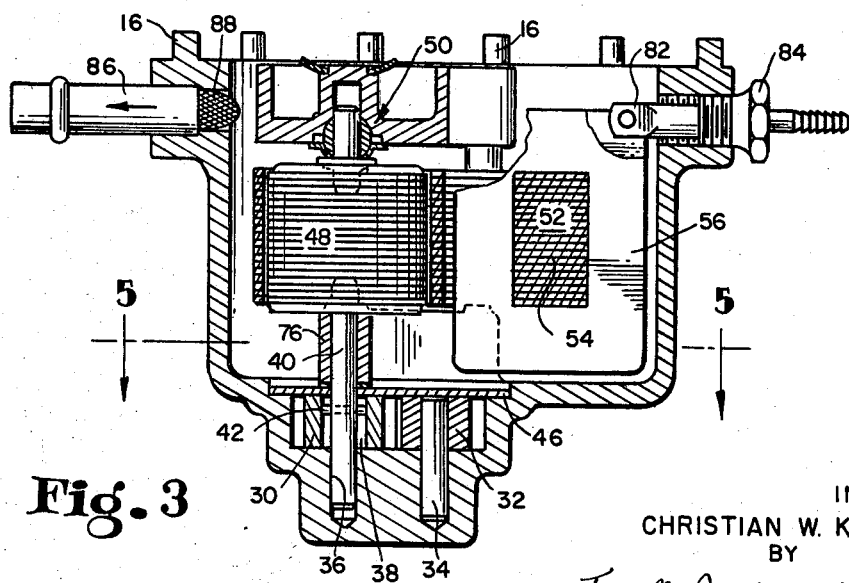
FIG. 3 is a longitudinal section on the center line of the main shaft, on the line 3—3 of FIG. 6.
Figure 4:
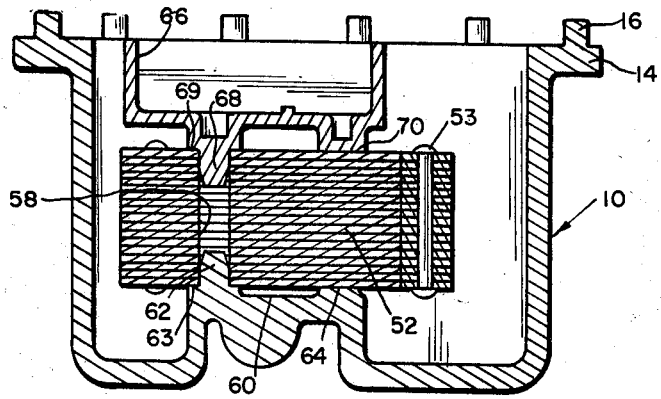
FIG. 4 is a longitudinal section in the plane of a stator mounting pad and locating post, on the line 4—4 of FIG. 6.
Figure 5:
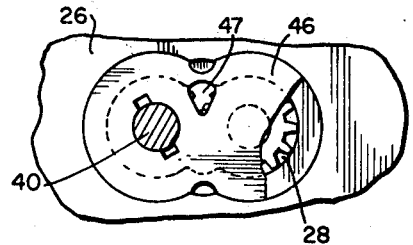
FIG. 5 is a plan view of the pump chamber, on the line 5—5 of FIG. 3.
Figure 6:
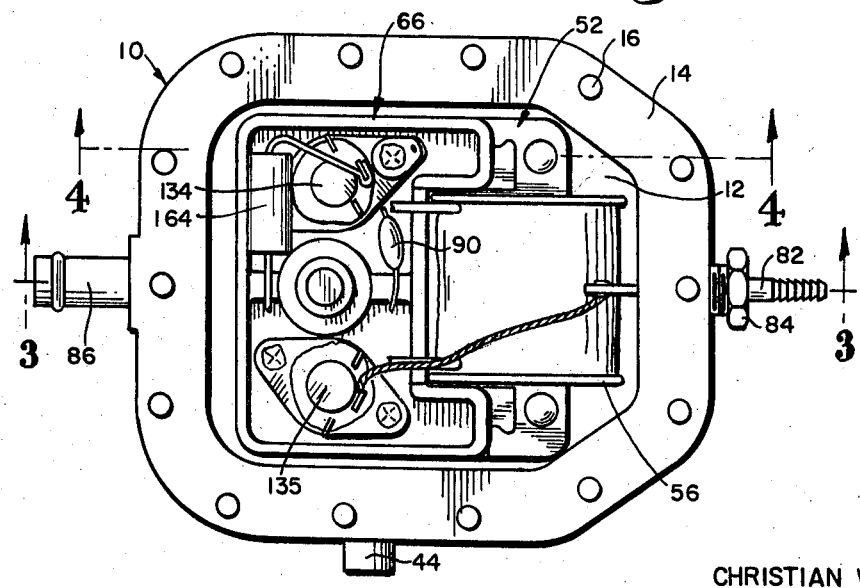
FIG. 6 is a plan view of the apparatus shown in FIGS. 1–4, with the cover removed.

As shown in FIGS. 3 and 6, the end bell 66 is a pan-shaped casting with a central bearing boss and a peripheral rim, and such casting serves as a receptacle, mounting and heat sink for components of the electrical circuit. Such circuit preferably has main and control windings on the bobbin 56 and as control elements includes two transistors 134 and 135, and a resistor 164, corresponding to the like-numbered components in the copending Kachuk application, and a spike-suppressing capacitor 90. The end bell 66 may be pre-assembled with the stator, and such elements may be fixed in the end bell and wired to the windings prior to final assembly.

The motor pump unit described lends itself to convenient and economical manufacture. The body housing 10 may be cast substantially to finished dimensions so that it requires a minimum of finishing operations. Before assembly, such casting is fitted with an idler gear shaft 34 and inlet and outlet nipples 44 and 86, and its terminal-receiving boss is suitably threaded for reception of the terminal plug 84. In assembly, a set of gears 30 and 32 are dropped into the pump chamber 28 and covered with an end plate 46. A main shaft 40 with a rotor 48 fixed thereon and carrying a spacer 76, shims 78 and a cross pin 42 is preassembled, and this sub-assembly is then placed in position with the lower end of the shaft inserted through the end plate 46 and gear 30 into the bearing 36. The stator 52 and its bobbin winding are pre-assembled with each other and may be pre-assembled with an end bell 66 containing electrical components and a bearing 72. The posts 68, and pads 69 and 70 will locate the end bell on the stator 52, and the electrical components may be connected to the windings in the sub-assembly. The sub-assembly is then assembled over the shaft 40 and rotor 48, the bearing 32 engaged on the shaft, and the stator 52 seated on the lands 60 over the posts 62. A terminal plug 84 is then inserted and the main electrical connections from the winding leads to the positive terminal 82 and the housing 10 are made. A spring washer 80 is mounted on the shouldered boss of the end bell 66, and a cover 18 and gasket 19 are assembled against the upper face of the rim 14 of the body housing 10, with the rivet studs 16 extending through openings in such cover 18. The cover is pressed down and the studs 16 are then riveted over to hold the cover 18 in place, and a screw 23 is inserted through the tongue 22 of the cover and mounting bracket, to brace the mounting wall 20.

For use, the inlet nipple 44 is connected to a suitable inlet line and the outlet nipple 86 is connected to a suitable delivery line, and electrical connections are made to ground the body of the assembly and to supply current to the positive terminal 82. In operation, the gears 30 and 32 pump liquid from the inlet through the discharge opening in the end plate 46 into the motor chamber 12, and the liquid is delivered through the flame screen 88 to the outlet nipple 86. Under normal conditions, the pump chamber and the motor chamber will be maintained full of liquid fuel, because the gear pump will normally obstruct backflow from the motor chamber 12 to the inlet 44.

Figure 7:
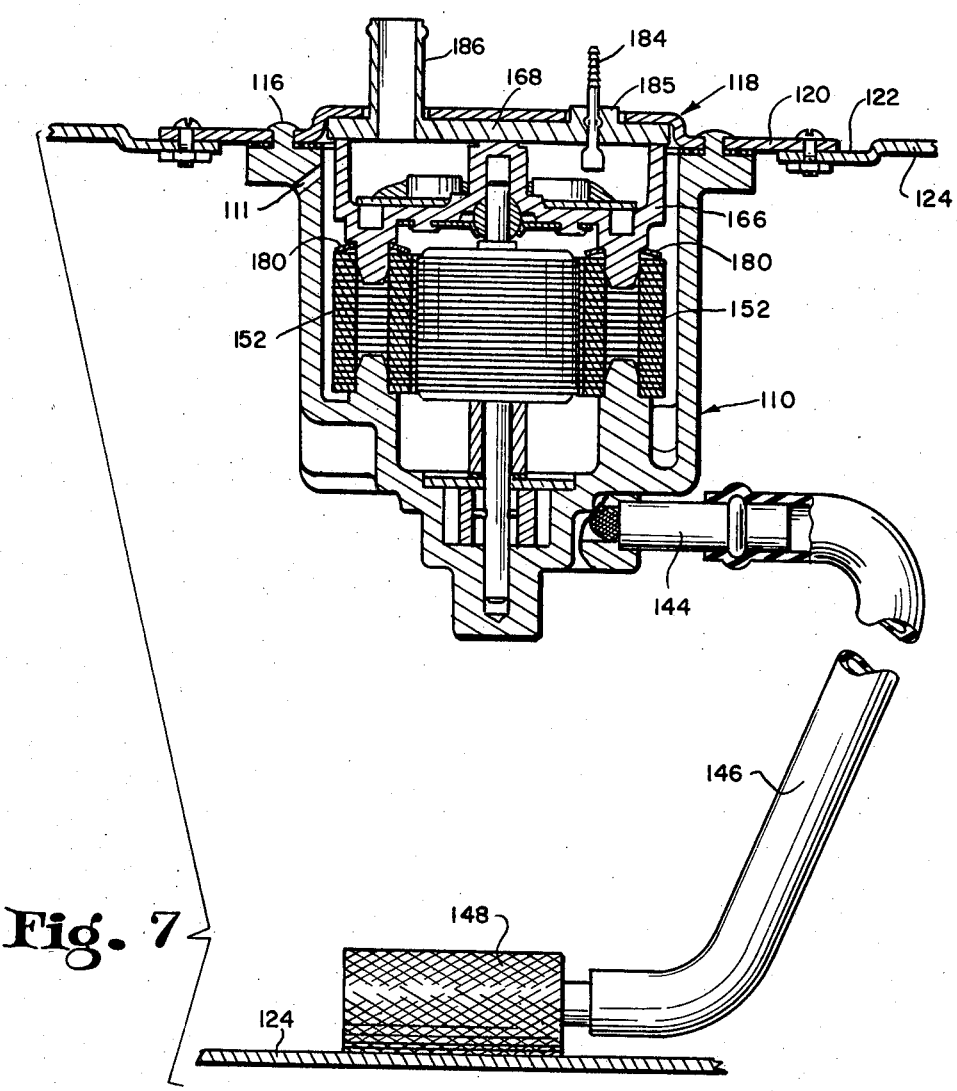
FIG. 7 is an axial sectional view of a modification in which the pump body assembly is closed by a cover plate which forms an in-tank mounting plate.

In the modification shown in FIG. 7, the body housing 110 is substantially identical with the housing 10 of FIGS. 1-6 and its contents are similar to those of FIGS. 1-6. However, the outlet nipple opening and the terminal-receiving opening are closed, and an outlet nipple 186 and an electrical terminal 184 are provided in the cover 118. The cover differs from that of FIGS. 1-6 in that it has a raised central portion and a flat border portion 120 adapted to be mounted on a peripheral seat 122 formed about an opening in a fuel tank 124. Such a mounting disposes the body of the motor pump unit within the tank 124, and its inlet nipple 144 is connected to an inlet tube 146 leading to a screen 148 resting on the bottom of the tank 124.

The motor assembly comprises a stator 152 mounted in the same manner as in FIGS. 1-6. Above this is the end bell 166, which abuts upward against a molded fitting 168 which is sealed against the raised portion of the cover 118 and provides the outlet nipple 186 and a boss 185 supporting the terminal 184 through openings in that cover 118. Stressed spring washers 180 are interposed between the stator 152 and the end bell 166 to allow for assembly tolerance and firmly hold the parts in assembled position. As before, such springs are compressed when the cover 118 is applied to the body housing 110 and are held compressed while the rivet studs 116 are riveted over.

In this modification of FIG. 7, where the pump is within the tank, the body housing may be provided with a restricted air bleed opening 111 leading from the top of the motor compartment to a point of discharge back to the tank. In a conventional carburetor fuel system, such a bleed opening of appropriate size will tend to discharge air from the motor compartment back to the tank before solid liquid is delivered through the outlet nipple 186 to the carburetor.

I claim:
1. A motor pump unit, comprising.
    a body housing forming a pump chamber and a motor chamber having a common axis,
    a cover for said housing,
    a main shaft carrying a motor rotor rotatable in said motor chamber and extending into said pump chamber,
    a first shaft bearing on said axis in said body housing,
    a pump rotor driven by said shaft in said pump chamber,
    a stator mounting seat formed on said body housing and facing said cover,
    and a motor assembly stack held between said seat and cover, and comprising a motor stator mounted on said seat in operative relation with said motor rotor, and an end bell mounted at the opposite end of the stator from said seat, said end bell supporting a second shaft bearing and being located from said body housing and stator, independently of said cover, to position such shaft bearing coaxially with said common axis,
    said cover serving to hold said motor assembly stack together and axially between itself and said seat.

2. A motor pump unit according to claim 1 with the addition of a stressed resilient member interposed in said stack between the cover and stator to take up assembly tolerances and hold the motor assembly in operating relationship.

3. A motor pump unit according to claim 1, in which said stator comprises an assembly of laminations having flat end faces and a plurality of locating holes through the laminations, and said seat comprises pads engaging an end face of the laminations, and a pair of locating posts received in said locating holes, the stator being located in the body casting and with respect to said axis by such pads and posts.

4. A motor pump unit according to claim 3, in which said end bell includes posts received in locating holes in the stator and is thereby located with respect to said axis.

5. A motor pump unit according to claim 4, in which said end bell includes pads engaging the opposite end face of the stator, with the addition of a stressed resilient member positioned between the cover and end bell and acting to urge the end bell toward the stator and the stator toward the seat.

6. A motor pump unit according to claim 5, in which said seat comprises posts having shoulders forming mounting pads at their bases, and also comprises abutment pads offset from said posts.

7. A motor pump unit according to claim 2, in which the stressed resilient member acts between the cover and end bell, the pump chamber is separated from the motor chamber by an end plate separate from the body housing and seated on a peripheral shoulder facing toward the end bell, said shaft carries thrust bearing means opposing axial displacement of said end plate from said shoulder, the opposite thrust on said shaft being taken by a bearing in said end bell, whereby thrust of said shaft is transmitted to the body and cover assembly through said end plate at one end and stressed yielding means at the other end.

8. A motor pump unit according to claim 1, in which the body housing forms a peripheral shoulder at the end of the pump chamber toward the motor chamber, an end plate seated on said shoulder to separate the pump chamber from the motor chamber, said shaft extending through said end plate and having thrust bearing means thereon opposing axial displacement of the end plate, and thrust bearing means opposing axial thrust of the shaft in the direction of such displacement.

9. A motor pump unit according to claim 8, in which the pump discharges to the motor chamber to produce delivery pressure therein, such delivery pressure acting on said end plate to urge it against said peripheral shoulder.

10. A motor pump unit according to claim 1, in which said end bell comprises a central boss supporting a bearing for said shaft, laterally spaced pads on said end bell seated against said stator, and a stressed resilient spring between said boss and cover to press said pads against the stator.

11. A motor pump unit according to claim 1, in which said end bell comprises a central boss supporting a bearing for said shaft, a radial wall, laterally spaced projections carried by said wall in locating relation with said stator, and a peripheral flange on said radial wall, extending toward said cover, and having edge portions in a plane parallel with said cover.

12. A motor pump unit according to claim 11, in which said end bell is formed of heat conductive metal to constitute a heat sink, and an electrical element mounted in heat-transmitting relation with said end bell heat sink.

13. A motor pump unit according to claim 11,
in which said stator carries windings including main windings and control windings,
said end bell includes locating posts engaged in holes in the stator to form a sub-assembly therewith,
and electrical control elements mounted in said end bell and connected to said windings.

14. A motor pump unit according to claim 13, in which said end bell is formed of heat conductive metal and said electrical control elements include semi-conductor devices mounted in heat-sink relation with said end bell.

15. A motor pump unit, comprising
a body housing having peripheral walls extending substantially parallel with a common axis and defining a motor chamber about such axis,
said walls in the transverse plane of said axis being offset inward at the bottom, the housing being formed at such offset to provide laterally-spaced, axially facing lands as a seat for a motor stator,
said housing forming a pump chamber below and between said lands, about said common axis,
a motor stator mounted on said seat, a rotor rotatable on said axis, including a motor rotor in operative relation with said stator and a pump rotor in pumping relation in said pump chamber,
an end bell above said stator,
and a cover secured to said body housing a close the motor chamber.

16. A motor pump unit according to claim 15,
in which the body housing forms a pump chamber defined by side and bottom walls and open to the motor chamber,
an end plate inserted between the pump chamber and motor chamber and providing a discharge opening from the pump chamber to the motor chamber,
and a delivery outlet through a wall of the motor chamber.

17. A motor pump unit according to claim 15,
in which the body housing has a cover-receiving rim at its top edge,
said cover being mounted on said rim, and a series of rivet posts formed on said body housing about said rim, extending through said cover and riveted over to fix the cover in place.

18. A motor pump unit according to claim 15,
with the addition that said cover is joined to a mounting wall extending downward in spaced relation with said body housing, and means bracing the mounting wall to the lower portion of the housing.

19. A motor pump unit according to claim 15,
in which said cover comprises a plate having at least one connector opening therethrough,
and a connector element supported against said cover by said end bell and extending through said cover.

20. A motor pump unit according to claim 19,
in which said stator and end bell form a stack between said stator seat and said cover, supporting said connector from said seat,
and a stressed resilient element interposed in said stack and resiliently pressing the connector element into sealing relation with the cover.

21. A motor pump unit according to claim 20,
in which said connector element includes both an outlet nipple and an electrical supply terminal.

References Cited

UNITED STATES PATENTS

| | | | |
|---|---|---|---|
| 2,139,370 | 12/1938 | Lauer et al. | 103—118 |
| 3,117,526 | 1/1964 | Zimmermann | 103—87 |
| 3,143,675 | 8/1964 | Hauenstein | 103—87 XR |
| 3,180,267 | 4/1965 | Bemmann, et al. | 103—87 |

ROBERT M. WALKER, Primary Examiner

U.S. Cl. X. R.

310—172